Figure 1:
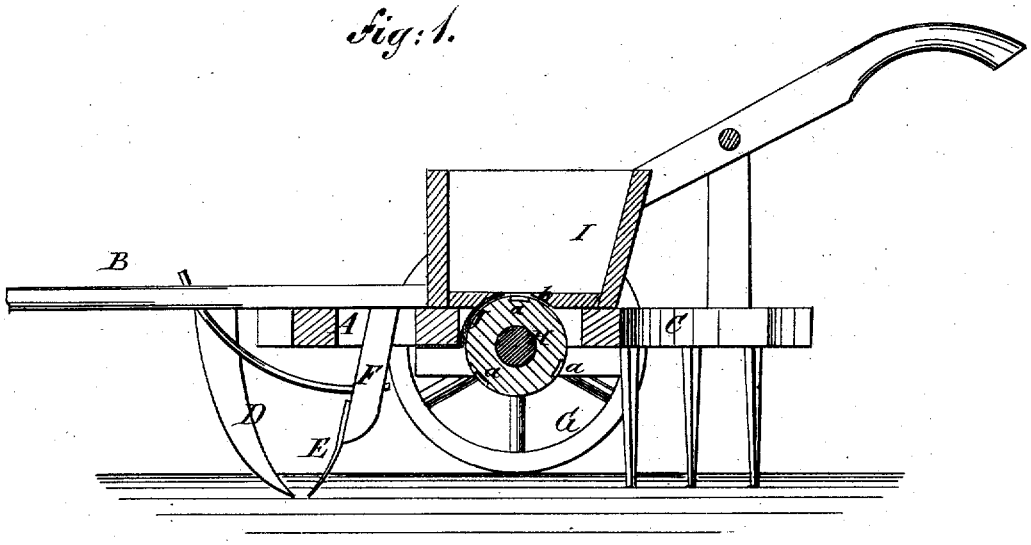

A. J. GOING.

CORN-PLANTER.

No. 7,462. Reissued Jan. 9, 1877.

WITNESSES:

Chas. Noda

John Goesthals

INVENTOR:

A. J. Going

BY Munn & Co

ATTORNEYS.

N. PETERS, PHOTO-LITHOGRAPHER, WASHINGTON, D. C.

UNITED STATES PATENT OFFICE.

ANDREW JACKSON GOING, OF CLINTON, LOUISIANA.

IMPROVEMENT IN CORN-PLANTERS.

Specification forming part of Letters Patent No. 77,811, dated May 12, 1868; reissue No. 7,462, dated January 9, 1877; application filed September 9, 1876.

*To all whom it may concern:*

Be it known that I, A. J. GOING, M. D., of Clinton, in the parish of East Feliciana and State of Louisiana, have invented a new and useful Improvement in Corn-Planters; and I do hereby declare that the following is a full, clear, and exact description thereof, which will enable those skilled in the art to make and use the same, reference being had to the accompanying drawings, forming part of this specification.

This invention relates to a new and improved machine for planting corn and other seed, such as pease, rice, &c., and is an improvement on that class of seeding-machines in which a rotating wheel provided with seed-cells in its periphery is used for a discharging device.

The invention will first be described in connection with the drawing, and then pointed out in the claim.

Figure 2:
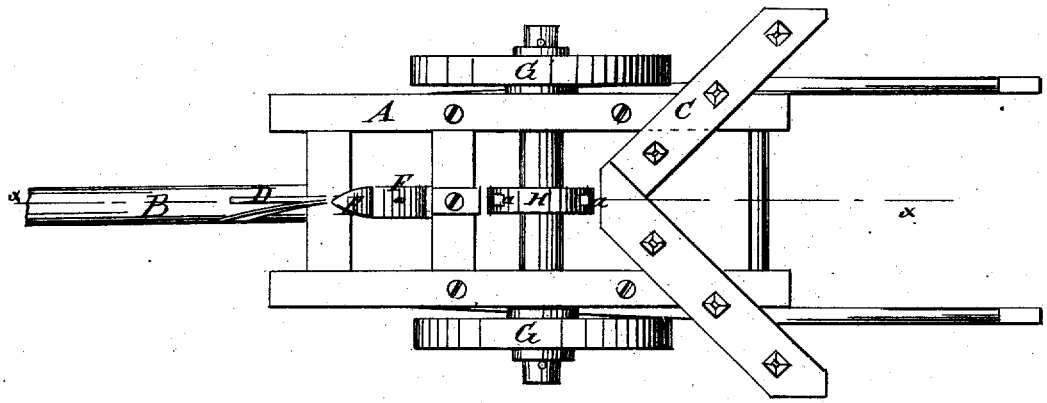

In the accompanying sheet of drawings, Figure 1 is a side sectional view of my invention, taken in the line X X, Fig. 2. Fig. 2 is an inverted plan of the same.

Similar letters of reference indicate corresponding parts.

A represents a rectangular frame, having a draft-pole, B, attached to its front end, and a beam, C, secured in its rear end, the latter being for covering the seed. To the rear part of the draft-pole there are attached a colter, D, and a furrow-opener, E, the latter being secured to the lower end of a standard, F, the upper end of which is framed into the draft-pole.

The furrow-opener E is similar to a cultivator-tooth in form, and may be of iron or steel; and the colter may also be of iron or steel, and curved, so that its front cutting-edge will incline backward, and its point be nearly in contact with the point of the furrow-opener, as shown clearly in Fig. 1.

By this means the furrow-opener is prevented from becoming choked or clogged.

The frame A is mounted on two wheels, G G′, the wheel G′ being permanently attached to its axle, and the wheel G fitted loosely thereon. The axle, therefore, turns with the wheel G′. On the axle there is permanently keyed or otherwise secured, at about its center, a wheel, H, having seed-cells *a* made in its periphery, any suitable number of cells being used, as circumstances may require. I represents a hopper, which is placed on the frame A, and has an oblong slot, *b*, made in its bottom, for the upper part of the wheel H to work in, the top of the wheel being flush with the upper surface of the bottom, as shown clearly in Fig. 1. J represents a thin metal plate, which is secured in the frame A underneath the hopper I, and passes up through the slot *b*, in contact with the front edge of the same, said plate being bent or curved to conform to the curvature of the periphery of the wheel H, as shown in Fig. 1. This plate J serves as a cut-off, effecting, as the wheel H rotates, a separation between the seed in the cells *a* and that in the hopper I, and retains the seed in the cells until the latter reach a proper point for the discharge of the seed.

Having thus described my invention, I claim as new and desire to secure by Letters Patent—

The arrangement of the colter D, furrow-opener E, and standard F with the beam B, as herein described, for the purpose specified.

A. J. GOING.

Witnesses:

JNO. A. WHITE, Jr.,

THOS. LANSDELL, Jr.